US008459569B2

(12) United States Patent
Gibbon et al.

(10) Patent No.: US 8,459,569 B2
(45) Date of Patent: Jun. 11, 2013

(54) INTEGRATED HEATING SYSTEM

(75) Inventors: Brian Gibbon, Upper Falmouth (CA); Matthew Romanow, Chester (CA)

(73) Assignee: Nu-Air Ventilation Systems Inc., Windsor, Nova Scotia ( * ) Notice: Subject to any disclaimer, the term of this patent is extended or adjusted under 35 U.S.C. 154(b) by 1136 days.

(21) Appl. No.: 12/365,199

(22) Filed: Feb. 4, 2009

(65) Prior Publication Data

US 2009/0194603 A1    Aug. 6, 2009

Related U.S. Application Data

(60) Provisional application No. 61/006,848, filed on Feb. 4, 2008.

(51) Int. Cl.
  *F24F 7/00*    (2006.01)
(52) U.S. Cl.
  USPC ............................ 237/48; 237/55; 165/59
(58) Field of Classification Search
  USPC ......................................... 237/48, 55; 165/59
  See application file for complete search history.

(56) References Cited

U.S. PATENT DOCUMENTS

| | | | | | |
|---|---|---|---|---|---|
| 148,567 | A | * | 3/1874 | Kendrick | 237/48 |
| 3,151,607 | A | * | 10/1964 | Brouillard | 237/48 |
| 4,079,885 | A | * | 3/1978 | Decker | 237/55 |
| 4,364,514 | A | * | 12/1982 | Toporek | 237/55 |
| 4,477,019 | A | * | 10/1984 | Breitbach | 237/55 |
| 4,629,117 | A | * | 12/1986 | Kasbohm | 237/55 |
| 4,653,574 | A | | 3/1987 | Quinlisk et al. | 165/54 |
| 4,751,910 | A | * | 6/1988 | Allen et al. | 237/55 |
| 4,834,285 | A | * | 5/1989 | Besik | 237/48 |
| 5,097,819 | A | * | 3/1992 | Talbert et al. | 165/111 |
| 5,117,563 | A | * | 6/1992 | Castonguay | 165/54 |
| 5,191,874 | A | * | 3/1993 | McWilliams | 237/48 |
| 5,257,736 | A | | 11/1993 | Roy | 236/49.3 |
| 5,348,077 | A | * | 9/1994 | Hillman | 165/59 |
| 5,855,320 | A | | 1/1999 | Grinbergs | 237/46 |
| 5,983,890 | A | * | 11/1999 | Thomas et al. | 165/48.1 |
| 6,089,221 | A | * | 7/2000 | Mano et al. | 237/2 A |
| 6,169,849 | B1 | | 1/2001 | Schmidt | 392/344 |

(Continued)

FOREIGN PATENT DOCUMENTS

JP    09072561 A  *  3/1997

OTHER PUBLICATIONS

Nu-Air Winsor Series manual, Dec. 12, 2006, downloaded from http://web.archive.org/web/20061221231332/http://www.nu-airventilation.com/specifications.html.*

*Primary Examiner* — Kang Hu
*Assistant Examiner* — Phillip E Decker
(74) *Attorney, Agent, or Firm* — Neil Teitelbaum; Doug MacLean; Teitelbaum & MacLean

(57) ABSTRACT

An integrated heating unit operates in a first heating mode, in which the heat of combustion gases is transferred to return air, and a second heat recovery mode, in which the heat of exhaust air is transferred to fresh air. The heating unit of the present invention utilizes the same heat exchanging unit and fans to transfer the heat from the combustion gases to the return air and to transfer heat from the exhaust air to the fresh air. The exhaust air is recovered from a select group of rooms, e.g. kitchens and bathrooms. A secondary heater can also be provided in the integrated unit in the form of a fireplace for providing an alternate or an additional source of the combustion gases.

9 Claims, 6 Drawing Sheets

U.S. PATENT DOCUMENTS

| | | | |
|---|---|---|---|
| 6,209,622 B1 * | 4/2001 | Lagace et al. | 165/54 |
| 6,347,527 B1 * | 2/2002 | Bailey et al. | 165/59 |
| 6,550,687 B2 * | 4/2003 | Lyons et al. | 237/55 |
| 6,755,138 B2 * | 6/2004 | McCarren | 165/154 |
| 6,779,735 B1 * | 8/2004 | Onstott | 165/248 |
| 6,908,039 B2 * | 6/2005 | Lyons et al. | 237/55 |
| 7,258,280 B2 * | 8/2007 | Wolfson | 454/256 |
| 7,942,193 B2 * | 5/2011 | Caldwell | 165/59 |
| 2001/0042610 A1 * | 11/2001 | Lyons et al. | 237/55 |
| 2005/0000681 A1 * | 1/2005 | Gagnon et al. | 165/66 |
| 2008/0061160 A1 * | 3/2008 | Ootomo et al. | 237/8 R |
| 2011/0189937 A1 * | 8/2011 | Hasegawa et al. | 454/239 |

* cited by examiner

HRV-only Mode

INTEGRATED HEATING SYSTEM

CROSS-REFERENCE TO RELATED APPLICATIONS

The present invention claims priority from U.S. Patent Application No. 61/006,848, filed Feb. 4, 2008, which is incorporated herein by reference.

TECHNICAL FIELD

The present invention relates to a furnace heating device, and in particular to a furnace heating device with an integrated heat recovery unit, which utilizes the same heat exchanger and fans.

BACKGROUND OF THE INVENTION

To improve the efficiency of conventional ventilation and/or heating systems separate heat exchange units, such as those disclosed in U.S. Pat. No. 4,653,574 issued Mar. 31, 1987 to Quinlisk et al, U.S. Pat. No. 5,257,736 issued Nov. 2, 1993 to Roy, U.S. Pat. No. 5,855,320 issued Jan. 5, 1999 to Grinbergs, and U.S. Pat. No. 6,169,849 issued Jan. 2, 2001 to Schmidt have been provided to preheat incoming fresh air with outgoing exhaust air. Conventional heat recovery units are designed to operate simultaneously with a primary heating system, e.g. furnace, and therefore require their own heat exchanging core, ductwork, dampers and control.

An object of the present invention is to overcome the shortcomings of the prior art by providing an integrated heating device with a combined furnace and heat recovery ventilator, which uses the same heat exchanger and fans for heating return air with a primary heating device, and for warming return air with warm and humid exhaust air.

SUMMARY OF THE INVENTION

Accordingly, the present invention relates to a heating unit located within an interior space including a first set of rooms and a second set of rooms comprising:
 a primary heater for generating primary combustion gases;
 a heat exchanger including:
  a fresh air input for receiving fresh air from outside the interior space;
  a return air input for receiving return air from the first set of rooms;
  a supply air output connected to the fresh air input and the return air input for supplying air to the first and second sets of rooms;
  a combustion gas input for receiving the primary combustion gases from the primary heater;
  an exhaust air input for receiving exhaust air from the second set of rooms;
  an exhaust air output connected to the combustion gas input and the exhaust air input;
  whereby heat is exchanged from the primary combustion gases to the return air or from the exhaust air to the fresh air;
 a first fan for drawing the primary combustion gases and the exhaust air through the heat exchanger, and for exhausting the primary combustion gases and the exhaust air outside the living space;
 a second fan for drawing in the return air from the first set of rooms or fresh air from outside the living space, and for blowing out the supply air into the first and second rooms; and
 a controller for switching between a heating mode in which the primary combustion gases heat the return air, and a heat recovery mode in which the exhaust air heats fresh air.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
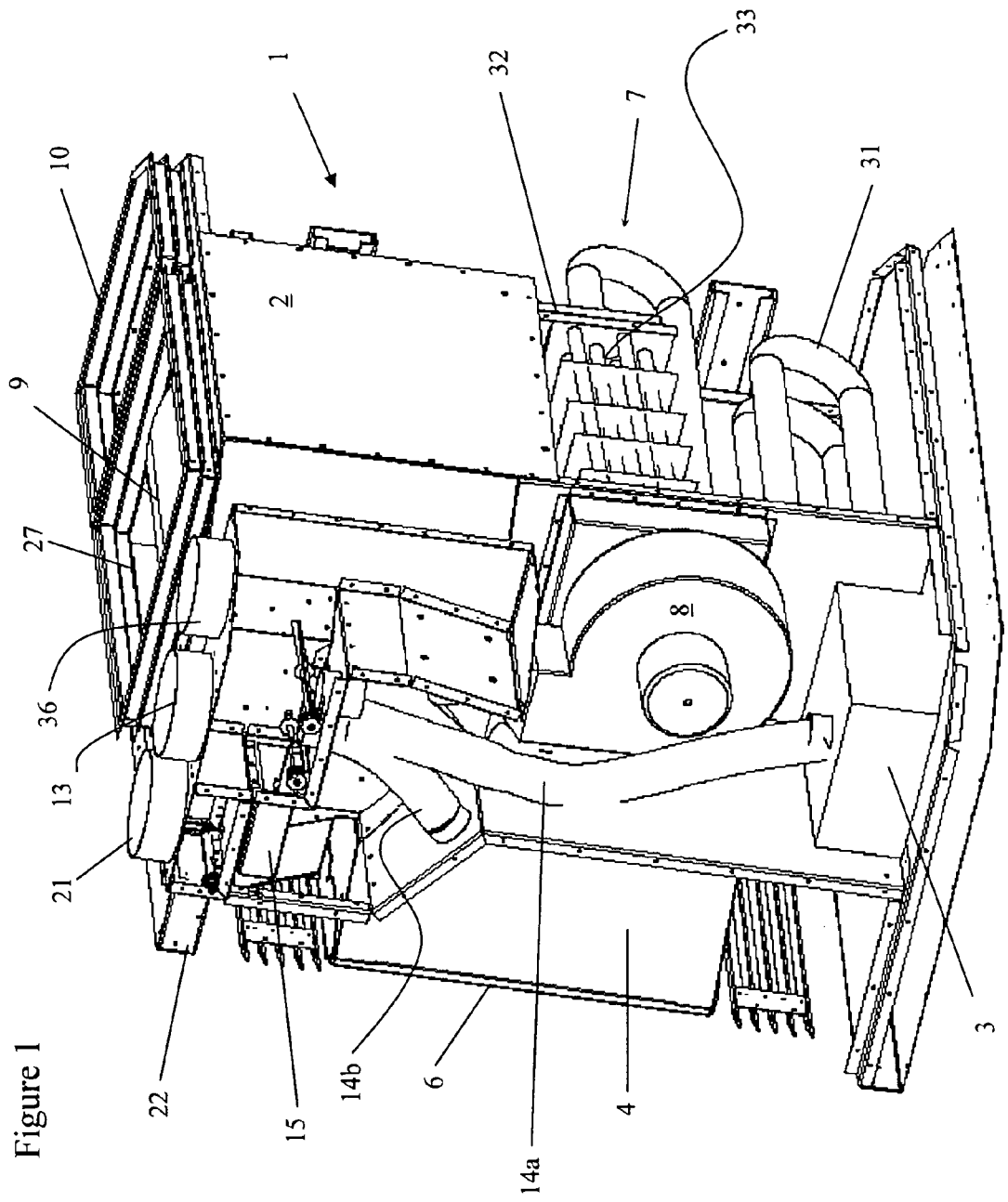
FIG. 1 is a isometric view of the heating unit according to the present invention
Figure 2:
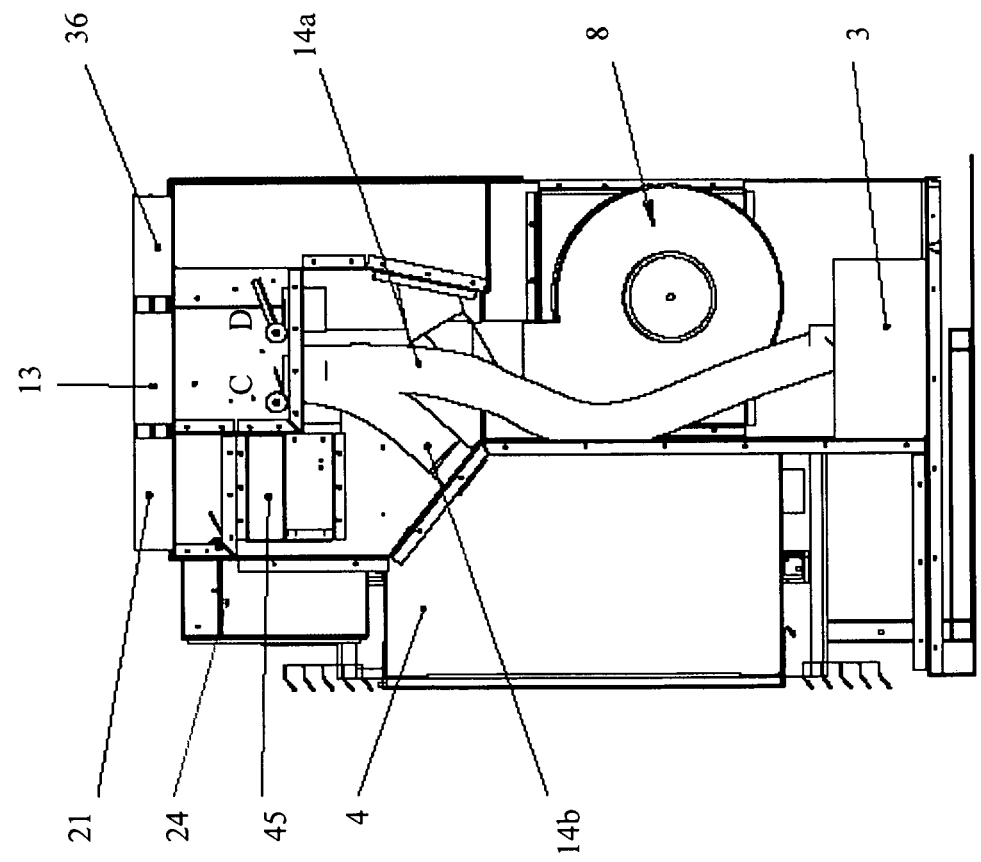
FIG. 2 is a side view of the heating unit of FIG. 1.

With reference to FIG. 1, the heating system 1, in accordance with the present invention, includes a housing 2 for enclosing a primary heater 3, which projects flames into a primary heat exchange coil 31, and preferably a secondary heater 4 in the form of a fireplace having a front 6 facing into a living space. Typically, both the primary and secondary heaters 3 and 4 are natural gas fired systems, in which the secondary heater 4 is a natural gas fireplace with a glass front window and an aesthetically pleasing artificial log design, although other forms of heating are possible, e.g. electrical, oil and wood. The heating system 1 also includes a common heat exchanger/heat recovery unit (HX/HRV) 7, a first variable speed inducer fan 8 for drawing hot furnace exhaust air or warm indoor exhaust air through one side of the HX/HRV 7 and to the outdoors, and a second supply blower fan 9 for drawing fresh outdoor air and/or indoor return air, for supplying the fresh or return air to the other side of the HX/HRV 7, and for blowing the supply air throughout the building via supply air output 10 and supply air passages 15. The supply air passages 15 are typically provided by the builder of the building or by the current or previous owners of the building.

Figure 5:
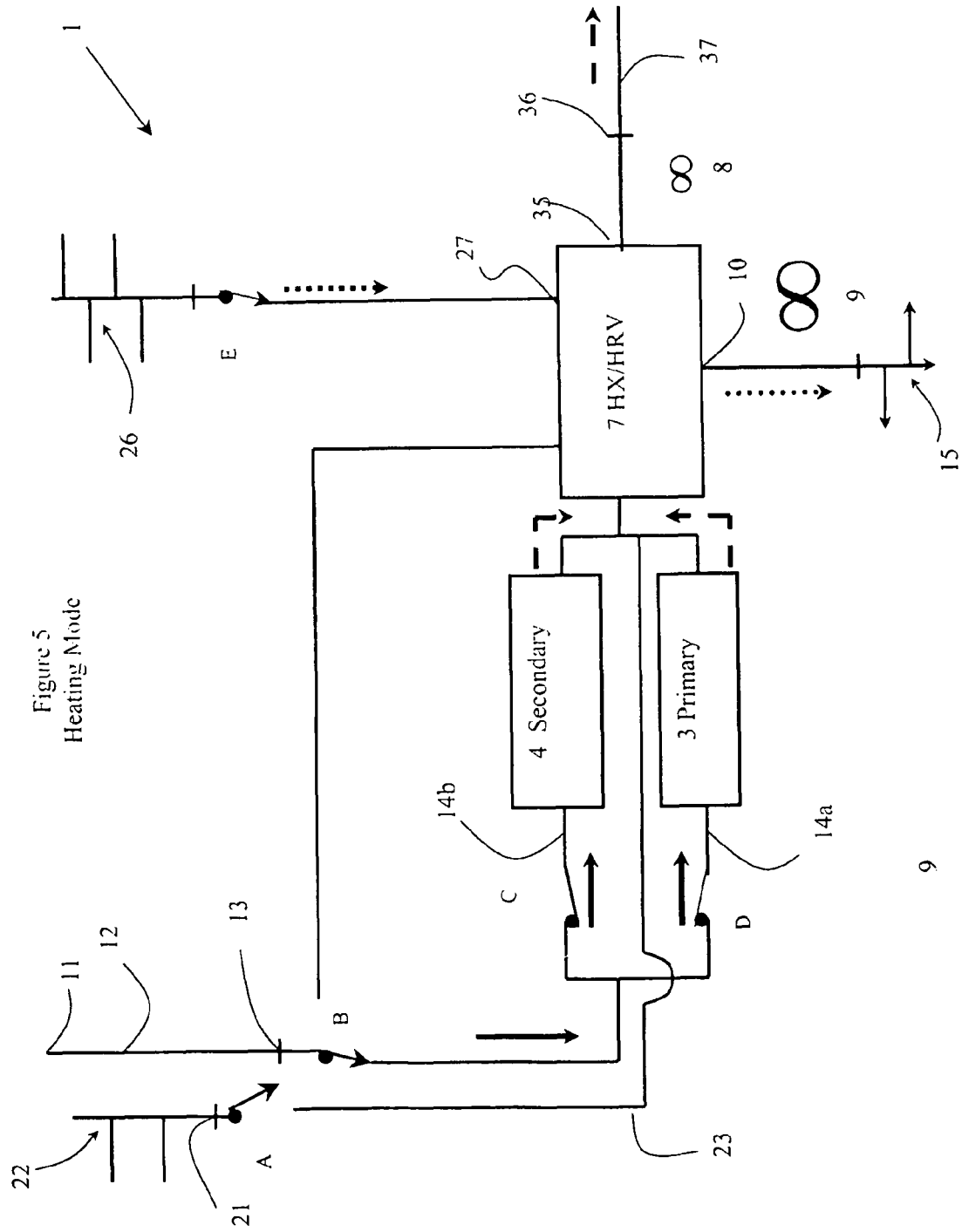
FIG. 5 is a schematic view of the heating unit of FIGS. 1 to 4 arranged in a heating mode of operation.

With reference to FIG. 5, a fresh air supply network includes a suitable outdoor inlet 11 with a fresh air inlet passage 12 of suitable length extending to a fresh air inlet port 13 on housing 2. A damper B proximate the fresh air inlet port 13 controls the flow of fresh air into the inlet port 13, and directs the fresh air for use in the primary and secondary heaters 3 and 4 or for use as supply air on the cold side of the HX/HRV 7. Portions or all of the fresh air supply network can be previously installed by the builder of the building or by the current or past owners. Damper D controls the passage of fresh air in primary fresh air conduit 14a extending to the primary heater 3, while damper C controls the passage of fresh air in secondary fresh air conduit 14b extending to the secondary heater 4. Alternatively, the fresh air damper B directs the fresh air through an HRV make-up filter 45 to the cool side of the HX/HRV 7 for use as supply air. Damper B can be replaced by a two or more dampers enabling fresh air to be supplied to the HX/HRV 7 in the heating mode to supplement the return air.

Figure 4:
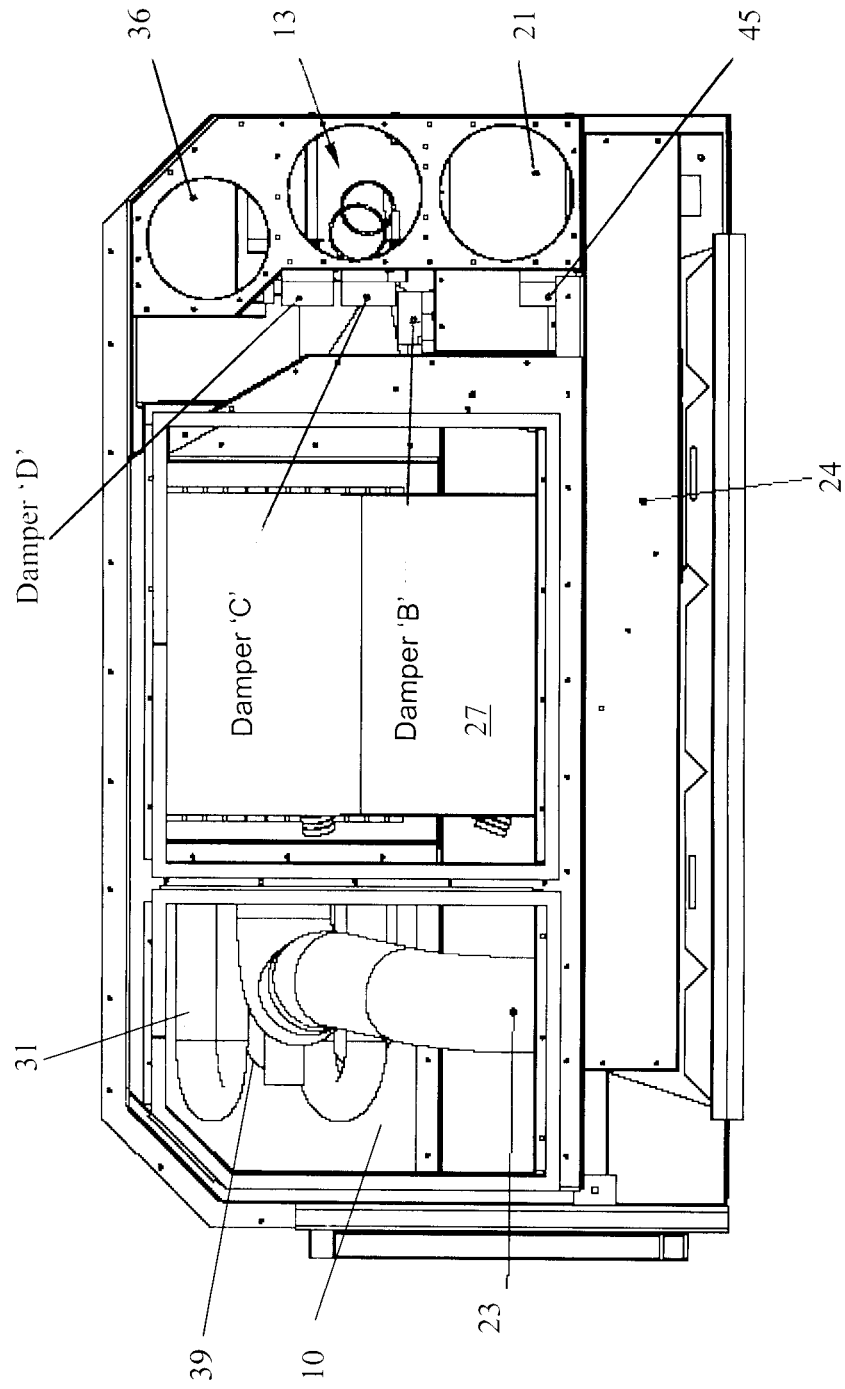
FIG. 4 is a top view of the heating unit of FIGS. 1, 2 and 3.

Air returning from the building to be recycled by the heating system 1 is classified into two groups: 1) warm, moist exhaust air, and 2) return air. The warm, moist exhaust air originates in specifically selected rooms, e.g. bathrooms, kitchens, exercise rooms etc, and is drawn through exhaust air passages 22 in the building to an exhaust air input 21 on the housing 2. With reference to FIG. 4, exhaust air damper A controls the flow of the exhaust air into an exhaust air conduit 23, through a stale air filter 24 to the hot side of the HX/HRV 7.

Dryer return air, more suitable for recirculation into the building is directed to the cold side of the HX/HRV 7 via return air passages 26 extending into dryer rooms in the building, less humid than the aforementioned selected moist rooms. A damper E controls the flow of return air through a return duct 27 to the cold side of the HX/HRV 7. Again, parts or all of the return and exhaust air passages can be provided by the original builder of the building or by the current or previous owners.

Products of the combustion from the primary and secondary heaters 3 and 4 and the exhaust air are drawn through the hot side of the HX/HRV 7, which is comprised an inlet header 32, and a secondary heat exchanger/condenser coil 33, by the first inducer fan 8, and blown out the exhaust output port 36 for output the building via suitable exhaust output passages 37.

With reference to FIG. 5, when the user sets the heating system 1 in a basic heating mode using a control system (not shown), fresh air (solid arrow) is drawn in from outside the building by the variable speed inducer fan 8 at approximately fifteen to twenty cfm through the outdoor inlet 11 and the fresh air passage 12 to the fresh air input port 13. The fresh air damper B is set to direct fresh air to the primary and secondary heaters 3 and 4, whereby fresh air passes through to primary and secondary dampers D and C for passage into the primary heater 3 and/or the secondary heater 4, depending on the users desire to heat using the primary heater 3, the secondary heater 4 or both at the same time. The inducer fan 8 draws the products of combustion (broken arrow) from the primary heaters 3 into the primary heat exchange coil 31 of the HX/HRV 7, which includes a plurality of straight lengths and 180° corners winding back and forth through the path of the return air, to the inlet header 32. Secondary combustion gases from the secondary heater 4 are delivered by the inducer fan 8 directly to the inlet header 32. The inlet header 32 then distributes the primary and secondary combustion gases to a plurality of parallel heat exchange coils in the secondary heat exchange coil 33 with smaller cross-sectional areas than the primary heat exchange coil 31, and with fins extending therefrom to increase the amount of surface area for heat exchange. The cooled combustion gases, e.g. @ approximately 120° F., are vented to the outside of the building via exhaust air conduits 35, exhaust outlet port 36 and exhaust air passages 37.

The secondary heat exchanger coil 33 removes heat and moisture from the combustion gases, which start at approximately 1500° F. in the primary heater 3 and end up at approximately 110 to 120° F. at the end of the secondary heat exchanger coil 33. Cool return air from the living space (square dotted arrow in FIG. 5) is returned via the return air inlet 27, passed over the primary and secondary heat exchanger coils 31 and 33, and blown out the supply duct outlet 10 as supply air (diamond dotted arrow in FIG. 5) by the second supply fan 9. The supply duct outlet 10 is connected with the duct system 15 for directing the heated air into various rooms of the living space. The second supply fan 9 draws approximately 800 cfm of cool return air from the living space at approximately 70° F., and delivers the heated supply air back to the living space at approximately 130° F. to 160° F. Condensation resulting from the cooling of the combustion gases is recovered in the form of water and piped to a drain (not shown).

Figure 3:
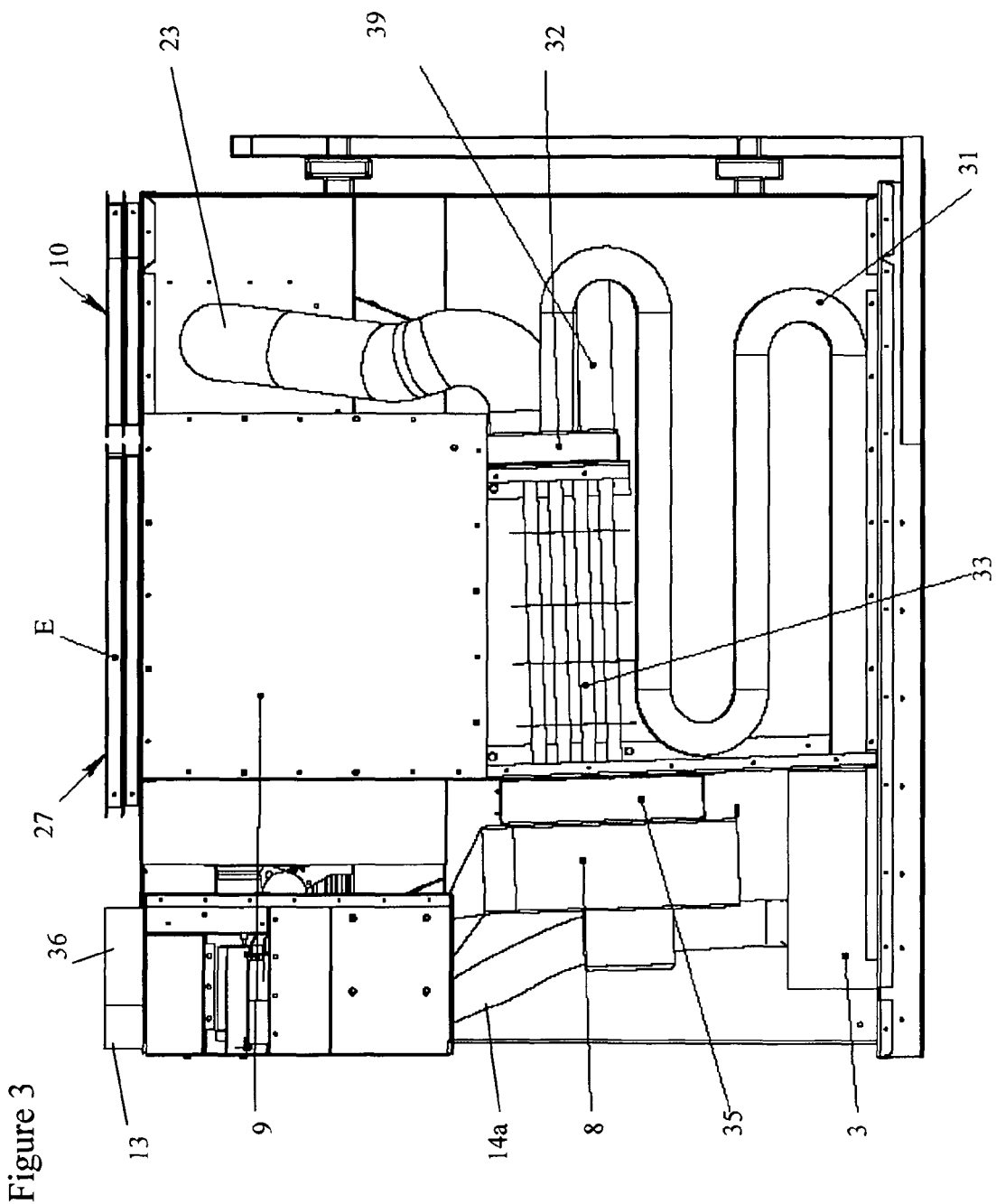
FIG. 3 is a rear view of the heating unit of FIGS. 1 and 2.

When the homeowner wishes to have a fire in the secondary heater 4, they can override the primary heater 3 or run both the primary and secondary heaters 3 and 4 simultaneously. The secondary heater 4 may be thermostatically controlled, to provide heat when called for, as with the primary heater 3. When the secondary heater 4 is on, fresh air is drawn in by the first variable speed inducer fan 8 at approximately 15 to 20 cfm through the fresh air inlet 13, through the damper C, and into the secondary heater 4, via a secondary heater combustion air conduit 14b. Secondary combustion gases from the secondary heater 4 are delivered to the inlet header 32 via a flue pipe 39 (FIG. 3) providing an additional (or alternative) source of heat for the secondary heat exchanger 33.

Figure 6:
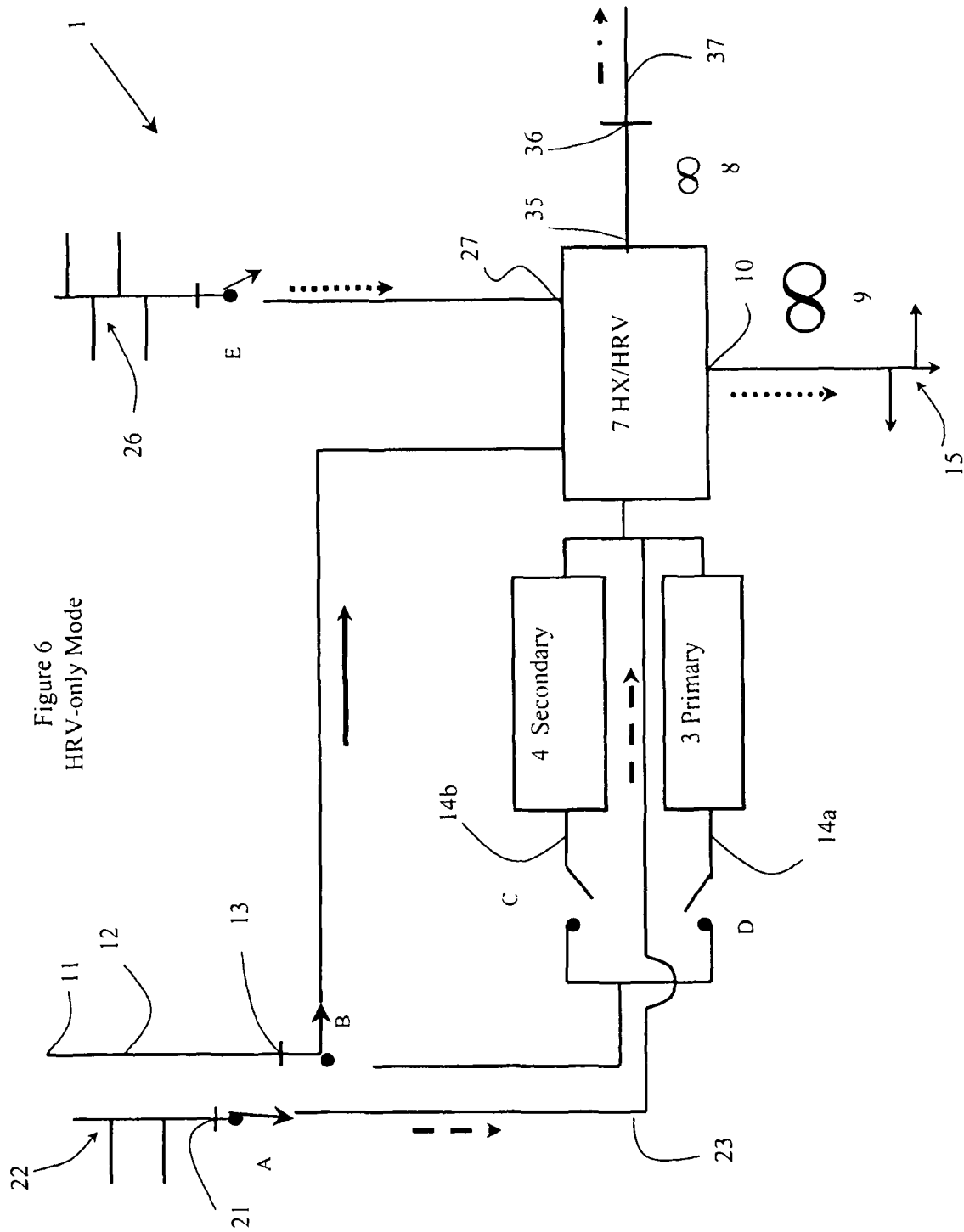
FIG. 6 is a schematic view of the heating unit of FIGS. 1 to 4 arranged in heat recovery mode of operation.

When neither of the primary and secondary heaters 3 and 4 are activated, a heat recovery ventilator (HRV-only) mode can be utilized. When the HRV-only mode is activated, damper A (which is normally closed to block passage of humid exhaust air therethrough) is activated, and warm, moist waste air (dashed line in FIG. 6), e.g. from kitchens, bathrooms, laundry rooms etc, is drawn into the secondary heat exchanger 33 by the inducer fan 8, e.g. 50 to 120 cfm @ 70° F., via the waste air inlet 21 and the waste air conduit 23 to act as a source of heat. The cooled waste air (dash/dot line in FIG. 6), e.g. 50° F., is vented to the outside via exhaust outlet 36 by the inducer fan 8. Fresh air (solid arrow in FIG. 6) is drawn in, e.g. 50 to 120 cfm @ 30° F., through the fresh air inlet 13, through the open damper B into the cold side of the secondary heat exchanger 33 to be heated to approximately 50° F. and delivered to the living space as supply air (diamond dotted line in FIG. 6) by the second supply blower 9 via supply duct outlet 10. The heated fresh air can be mixed with the return air (square dotted in FIG. 6) or if all fresh air is required, then the damper E can be closed to block return air from returning via the return air input 27. During HRV-only mode, damper B is open, while dampers C and D are closed, preventing fresh outdoor air from entering the first and second heaters 3 and 4.

We claim:

1. A heating unit located within an interior space including a first set of rooms and a second set of rooms, the second set of rooms not having any rooms in common with the first set of rooms, comprising:
    a primary heater for generating primary combustion gases;
    a heat exchanger including:
        a fresh air input for receiving fresh air from outside the interior space;
        a return air input for receiving return air from the first set of rooms;
        a supply air output connected to the fresh air input and the return air input for supplying air to the first and second sets of rooms;
        a combustion gas input for receiving the primary combustion gases from the primary heater;
        an exhaust air input for receiving exhaust air from the second set of rooms; an exhaust air output connected to the combustion gas input and the exhaust air input;
        whereby heat is exchanged from the primary combustion gases to the return air or from the exhaust air to the fresh air;
    a first fan for drawing the primary combustion gases and the exhaust air through the heat exchanger, and for exhausting the primary combustion gases and the exhaust air outside the interior space;
    a second fan for drawing in the return air from the first set of rooms or fresh air from outside the living space, and for blowing out the supply air into the first and second rooms; and a controller for switching between a heating mode in which the primary combustion gases heat the return air, and a heat recovery mode in which the exhaust air heats fresh air.

2. The heating unit according to claim 1, further comprising a first damper for preventing exhaust air from entering the heat exchanger while in the heating mode, and for enabling exhaust air to enter the heat exchanger while in the heat recovery mode.

3. The heating unit according to claim 1, further comprising a second damper for directing fresh air to the primary heater while in the heating mode, and for directing fresh air to the fresh air input port of the heat exchanger while in the heat recovery mode.

4. The heating unit according to claim 1, further comprising a third damper for directing return air to the return air input port of the heat exchanger when in the heating mode, and for enabling or preventing the return air from entering the return air input port of the heat exchanger when in the heat recovery mode.

5. The heating unit according to claim 1, further comprising:
   a secondary heater for generating secondary combustion gases; and
   a secondary heater conduit for directing the second combustion gases to the heat exchanger;
   wherein the heat exchanger exchanges heat from the secondary combustion gases to the return air forming supply air; and
   wherein the secondary heater includes a fireplace cavity viewable from the interior space.

6. The heating unit according to claim 5, wherein the controller is also for switching between generating primary combustion gases in the primary heater, secondary combustion gases in the secondary heater or both primary and secondary gases in both the primary and secondary heaters for heating the return air.

7. The heating unit according to claim 5, wherein the heat exchanger includes a primary heat exchange coil comprised of a plurality of sequential lengths and corners of pipe, and a secondary heat exchange coil including an inlet header and a plurality of parallel pipes with heat exchange fins thereon; and
   wherein the secondary heater conduit is connected to the inlet header.

8. The heating unit according to claim 5, wherein the controller is also for switching between generating primary combustion gases in the primary heater, secondary combustion gases in the secondary heater or both primary and secondary gases in both the primary and secondary heaters for heating the return air.

9. The heating unit according to claim 1, wherein the heat exchanger includes a primary heat exchange coil comprised of a plurality of sequential lengths and corners of pipe, and a secondary heat exchange coil including an inlet header and a plurality of parallel pipes with heat exchange fins thereon.

* * * * *